(12) United States Patent
Tsushima et al.

(10) Patent No.: US 7,049,032 B2
(45) Date of Patent: May 23, 2006

(54) SECONDARY POWER SOURCE

(75) Inventors: Manabu Tsushima, Kanagawa (JP); Takeshi Morimoto, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 447 days.

(21) Appl. No.: 10/201,107

(22) Filed: Jul. 24, 2002

(65) Prior Publication Data

US 2003/0049533 A1   Mar. 13, 2003

(30) Foreign Application Priority Data

| Jul. 25, 2001 | (JP) | ............................ 2001-224321 |
| Sep. 20, 2001 | (JP) | ............................ 2001-286853 |
| Nov. 8, 2001 | (JP) | ............................ 2001-342718 |

(51) Int. Cl.
*H01M 4/48* (2006.01)

(52) U.S. Cl. ............................... 429/231.4; 429/231.8; 429/324; 429/331; 429/332; 429/338; 429/342; 429/245

(58) Field of Classification Search ............ 429/231.4, 429/324, 245, 331, 332, 338, 342
See application file for complete search history.

(56) References Cited

U.S. PATENT DOCUMENTS

| 5,652,072 | A | 7/1997 | Lamanna et al. |
| 5,691,081 | A | 11/1997 | Krause et al. |
| 5,953,204 | A | 9/1999 | Suhara et al. |
| 6,294,292 | B1 | 9/2001 | Tsushima et al. |
| 6,558,846 | B1 * | 5/2003 | Tsushima et al. ........ 429/231.8 |
| 6,824,923 | B1 * | 11/2004 | Che et al. ................ 429/231.4 |

FOREIGN PATENT DOCUMENTS

| EP | 0 886 334 | | 12/1998 |
| EP | 0 973 180 | | 1/2000 |
| EP | 1 239 495 | | 9/2002 |
| EP | 1 239 527 | | 9/2002 |
| JP | 64-014882 | * | 1/1989 |
| JP | 64-14882 | | 1/1989 |
| JP | 8-107048 | | 4/1996 |
| JP | 9-50823 | | 2/1997 |
| JP | 9-55342 | | 2/1997 |
| JP | 2000-195554 | | 7/2000 |
| JP | 2001-76756 | * | 3/2001 |
| WO | WO 99/30381 | | 6/1999 |

OTHER PUBLICATIONS

Larry J. Krause, et al., "Corrosion of Aluminum at High Voltages in Non-Aqueous Electrolytes Containing Perfluoroalkylsulfonyl Imides; New Lithium Salts for Lithium-Ion Cells", Journal of Power Sources, vol. 68, 1997, pp. 320-325.
Patent Abstracts of Japan, JP 11-007962, Jan. 12, 1999.

* cited by examiner

*Primary Examiner*—Laura Weiner
(74) *Attorney, Agent, or Firm*—Oblon, Spivak, McClelland, Maier & Neustadt, P.C.

(57) ABSTRACT

A secondary power source comprising a positive electrode made mainly of activated carbon, a negative electrode made mainly of a carbon material capable of doping and undoping lithium ions and an organic electrolyte containing a solute of a lithium salt, wherein the lithium salt comprises $LiN(SO_2R^{f1})(SO_2R^{f2})$ wherein each of $R^{f1}$ and $R^{f2}$ which are independent of each other, is a $C_{1-6}$ perfluoroalkyl group except $R^{f1}=R^{f2}=CF_3$.

8 Claims, No Drawings

SECONDARY POWER SOURCE

The present invention relates to a secondary power source having a high upper limit voltage, a large charge and discharge capacity and excellent charge and discharge cycle reliability in rapid charging and discharging, and an organic electrolyte therefore.

As a power source which employs an organic electrolyte and which is capable of charging and discharging, an electric double layer capacitor or a lithium ion secondary cell may, for example, be mentioned. Further, a secondary power source is also known wherein a positive electrode for an electric double layer capacitor and a negative electrode for a lithium ion secondary cell, are used in combination.

The electric double layer capacitor is characterized in that polarizable electrodes made mainly of activated carbon are used for both positive and negative electrodes. The upper limit voltage of an electric double layer capacitor is 1.2V when an aqueous electrolyte is used, or from 2.5 to 3.3V when an organic electrolyte containing $BF_4^-$ is used. The electrostatic energy of the electric double layer capacitor is proportional to the square of the upper limit voltage. Accordingly, an organic electrolyte having a high upper limit voltage provides a high energy as compared with an aqueous electrolyte. However, even with an electric double layer capacitor employing an organic electrolyte containing $BF_4^-$, the capacity is currently as low as at most 1/10 of a nickel hydride secondary cell used as a power source on a hybrid electric car, and further improvement of the energy is required.

On the other hand, the lithium ion secondary cell comprises a positive electrode made mainly of a lithium-containing transition metal oxide, a negative electrode made mainly of a carbon material capable of doping and undoping lithium ions, and an organic electrolyte containing a lithium salt such as $LiPF_6$. By charging, lithium ions will be undoped from the positive electrode and will be doped to the carbon material of the negative electrode. By discharging, lithium ions will be undoped from the negative electrode and will be doped to the positive electrode. The lithium ion secondary cell has characteristics such that it can be operated at a high voltage and has a large capacity as compared with the electric double layer capacitor. However, it has had problems such that the resistance is high, and the useful life due to rapid charge and discharge cycles is very short as compared with the electric double layer capacitor.

Whereas, a secondary power source which employs activated carbon for a positive electrode and a carbon material capable of doping and undoping lithium ions for a negative electrode, can be made to have a high upper limit voltage and a high energy as compared with a conventional electric double layer capacitor which employs activated carbon for both positive and negative electrodes. Especially when a graphite type carbon material low in potential for doping and undoping lithium ions, is used for a negative electrode, such a secondary power source can be made to have a larger capacity. Further, it is excellent in charge and discharge cycle reliability, since the positive electrode active material itself is free from doping or undoping of lithium ions as observed in the lithium ion secondary cell, and the positive electrode is free from deterioration due to doping or undoping of lithium ions.

For example, JP-A-64-14882 proposes a secondary power source for an upper limit voltage of 3V, which employs an electrode composed mainly of activated carbon as a positive electrode and an electrode having lithium ions preliminarily doped in a carbon material having a lattice spacing of face of from 0.338 to 0.356 nm as measured by X-ray diffraction, as a negative electrode. Further, JP-A-8-107048 proposes a battery which employs, for a negative electrode, a carbon material having lithium ions preliminarily doped by a chemical method or by an electrochemical method in a carbon material capable of doping and undoping lithium ions. Still further, JP-A-9-55342 proposes a secondary power source for an upper limit voltage of 4V, which has a negative electrode having a carbon material capable of doping and undoping lithium ions supported on a porous current collector which does not form an alloy with lithium.

In the above-mentioned secondary power sources, an organic electrolyte containing $BF_4^-$ or $PF_6^-$, is used (JP-A-64-14882). An electrolyte containing $BF_4^-$ has a relatively low electrical conductivity and thus has a problem such that the discharge capacity is inadequate in discharging at a high current density. On the other hand, an electrolyte containing $PF_6^-$, is excellent in electrical conductivity and has a high upper limit voltage, but it is thermally unstable. Further, if water is present even in a very small amount in the system, $PF_6^-$ undergoes hydrolysis to form HF, which in turn causes deterioration of the current collector and the active materials of the positive and negative electrodes, thus leading to self discharge and a decrease of the capacity. Further, the electrolyte concentration decreases by this hydrolysis, whereby there will be a problem such that the charge and discharge cycle reliability will be lost.

In order to solve such problems, it has been proposed to use an electrolyte containing $N(SO_2CF_3)_2^-$ (JP-A-8-107048). This electrolyte is thermally stable and hardly susceptible to the above-mentioned hydrolysis, and it is also excellent in electrical conductivity. However, when the positive electrode potential becomes noble to some extent, $N(SO_2CF_3)_2^-$ tends to corrode aluminum, when aluminum is used as a constituting material for a current collector for the positive electrode. Such corrosion is distinctly observed especially during operation at a high temperature. For example, if an organic electrolyte containing $N(SO_2CF_3)_2^-$ is used in an electric double layer capacitor or a lithium ion secondary cell having an aluminum current collector for the positive electrode, corrosion of the current collector will take place and aluminum will dissolve in the organic electrolyte, when a voltage of at least 2.5V or at least 4.0V, respectively, is applied in an atmosphere of 45° C. Namely, the electrical charge to be charged, is used for dissolution of aluminum, and consequently, the capacity decreases. Especially when it is used for a lithium ion secondary cell, the negative electrode potential during charging, is substantially equal to lithium metal, whereby once aluminum elutes, the aluminum precipitates on the negative electrode or forms an alloy with lithium, thus leading to a further decrease of the capacity, and thus, it has been difficult to obtain adequate cycle reliability.

In order to solve such problems, for example, JP-A-9-50823 proposes a lithium ion secondary cell having an organic electrolyte containing both $LiPF_6$ and $LiN(SO_2CF_3)_2$, and it is disclosed that corrosion of a positive electrode current collector made of aluminum can be suppressed, and yet, a lithium ion secondary cell excellent in charge and discharge cycle reliability, can be obtained. However, this method is supposed to be used for operation at room temperature, and at a temperature exceeding room temperature, particularly at a temperature of at least 45° C., corrosion of a positive electrode current collector made of aluminum cannot be prevented during operation at a high voltage exceeding 4.0V.

In recent years, when a power source capable of charging and discharging, is mounted as a power source (required voltage: about 300V) for a hybrid electric car, it is required to minimize the number of unit cells stacked in series. Accordingly, it is an object of the present invention to provide a secondary power source which can be operated at a higher voltage and which has a high charge and discharge capacity and excellent cycle reliability in rapid charging and discharging, and an organic electrolyte therefor.

The present invention provides a secondary power source comprising a positive electrode made mainly of activated carbon, a negative electrode made mainly of a carbon material capable of doping and undoping lithium ions and an organic electrolyte containing a solute of a lithium salt, wherein the lithium salt comprises $LiN(SO_2R^{f1})(SO_2R^{f2})$ wherein each of $R^{f1}$ and $R^{f2}$ which are independent of each other, is a $C_{1-6}$ perfluoroalkyl group except $R^{f1}=R^{f2}=CF_3$.

Further, the present invention provides a secondary power source comprising a positive electrode made mainly of activated carbon, a negative electrode made mainly of a carbon material capable of doping and undoping lithium ions and an organic electrolyte containing a solute of a lithium salt, wherein the lithium salt comprises $LiClO_4$ and $LiN(SO_2R^{f11})(SO_2R^{f12})$ wherein each of $R^{f11}$ and $R^{f12}$ which are independent of each other, is a $C_{1-6}$ perfluoroalkyl group.

Still further, the present invention provides a power source which is capable of charging and discharging, comprising a positive electrode assembly having a positive electrode and a current collector integrated, a negative electrode assembly having a negative electrode and a current collector integrated, and an organic electrolyte, wherein the current collector in the positive electrode assembly is aluminum, and said organic electrolyte comprises a solute which forms $ClO_4^-$ by ionization and a solute which forms $N(SO_2C_2F_5)_2^-$ by ionization.

In this specification, one having a positive electrode and a current collector bonded and integrated, will be referred to as a positive electrode assembly. A similar definition applies to a negative electrode assembly. Further, in this specification, a power source capable of charging and discharging, which comprises a positive electrode made mainly of activated carbon, a negative electrode made mainly of a carbon material capable of doping and undoping lithium ions, and an organic electrolyte containing a solute of a lithium salt, will be referred to simply as a secondary power source.

In the first embodiment of the secondary power source of the present invention (hereinafter referred to as the present secondary power source), the lithium salt in the organic electrolyte comprises $LiN(SO_2R^{f1})(SO_2R^{f2})$ wherein each of $R^{f1}$ and $R^{f2}$ which are independent of each other, is a $C_{1-6}$ perfluoroalkyl group except $R^{f1}=R^{f2}=CF_3$. Such a lithium salt has a higher electrical conductivity as the carbon numbers in $R^{f1}$ and $R^{f2}$ are smaller. On the other hand, it tends to hardly corrode a positive electrode current collector made of aluminum, as the carbon numbers in $R^{f1}$ and $R^{f2}$ become large. Especially, $LiN(SO_2C_2F_5)_2$ wherein the carbon numbers in $R^{f1}$ and $R^{f2}$ are both 2, is preferred, since it has a high electrical conductivity and yet scarcely corrodes a positive electrode current collector made of aluminum. Further, so long as the carbon numbers in $R^{f1}$ and $R^{f2}$ are independently within a range of from 1 to 6, $R^{f1}$ and $R^{f2}$ may be different as in $LiN(SO_2C_2F_5)(SO2C_3F_7)$, and $R^{f1}$ and $R^{f2}$ may be linear or branched. If $LiN(SO_2CF_3)_2$ wherein both $R^{f1}$ and $R^{f2}$ are $CF_3$, is employed for a secondary power source having an aluminum current collector for the positive electrode, there will be a problem such that it corrodes the current collector, and such corrosion tends to be remarkable especially during operation under a high voltage exceeding 4.0V at a temperature exceeding room temperature, especially at a temperature of 45° C. or higher. Therefore, the lithium salt in the first embodiment of the present secondary power source is more preferred than $LiN(SO_2CF_3)_2$.

Now, in the second embodiment of the present secondary power source, the lithium salt in the organic electrolyte comprises $LiClO_4$ and $LiN(SO_2R^{f11})(SO_2R^{f12})$ wherein each of $R^{f11}$ and $R^{f12}$ which are independent of each other, is a $C_{1-6}$ perfluoroalkyl group. $LiClO_4$ does not substantially react with a very small amount of moisture present in the organic electrolyte or in activated carbon of the positive electrode, and it does not corrode a positive electrode current collector and is excellent in electrical conductivity and capable of increasing the capacity of the electrode made mainly of activated carbon. Thus, it has excellent characteristics as the electrolyte for the present secondary power source. However, if $LiClO_4$ is used in a high concentration, a delicate care will be required, and restrictions in practical use will be substantial, whereby it is difficult to incorporate it in a high concentration in the organic electrolyte. On the other hand, the capacity cannot be increased adequately with the organic electrolyte having a low concentration of the solute. Therefore, a mixed system comprising $LiClO_4$ and another lithium salt, is employed.

The present inventors have found that in the second embodiment of the present secondary power source, by controlling $LiClO_4$ to a predetermined concentration and by using it in combination with a lithium salt represented by $LiN(SO_2R^{f11})(SO_2R^{f12})$, it is possible to obtain a practical secondary power source. In the second embodiment of the present secondary power source, it is especially preferred, from the viewpoint of improvement of electrical conductivity, to use a mixed system comprising $LiClO_4$ and at least one member selected from the group consisting of $LiN(SO_2CF_3)_2$ and $LiN(SO_2C_2F_5)_2$. Especially, a mixed system comprising $LiN(SO_2C_2F_5)_2$ and $LiClO_4$ is preferred in consideration of the stability at a high temperature.

In the second embodiment of the present secondary power source, it is preferred that in the lithium salt contained in the organic electrolyte, from 1 to 40 mol % is $LiClO_4$, and from 60 to 99 mol % is $LiN(SO_2R^{f11})(SO_2R^{f12})$ If $LiClO_4$ is less than 1 mol % in the above lithium salt, no adequate effect of using $LiClO_4$ as a lithium salt can be obtained, such being undesirable. On the other hand, if it exceeds 40 mol %, a sufficient care will be required for its handling, and restrictions in practical use will be substantial, such being undesirable. It is particularly preferred that in the above lithium salt, from 3 to 20 mol % is $LiClO_4$, and from 80 to 97 mol % is $LiN(SO_2R^{f11})(SO_2R^{f12})$.

Now, practical embodiments suitable for both the first and second embodiments of the present secondary power source will be described.

In the present secondary power source, the solvent of the organic electrolyte may, for example, be ethylene carbonate, propylene carbonate, butylene carbonate, dimethyl carbonate, ethylmethyl carbonate, diethyl carbonate, sulfolane or dimethoxyethane.

It is further preferred that the solvent of the organic electrolyte is at least one member selected from the group consisting of ethylene carbonate, propylene carbonate, ethylmethyl carbonate, dimethyl carbonate and diethyl carbonate.

In the present secondary power source, the concentration of the lithium salt in the organic electrolyte is preferably from 0.5 to 2.0 mol/l in the organic electrolyte, whereby an organic electrolyte having a high electrical conductivity can be obtained. If the concentration of the lithium salt is less than 0.5 mol/l, ions are few, and the electrical conductivity tends to be too low. On the other hand, if it exceeds 2.0 mol/l, the viscosity of the organic electrolyte is likely to be too high. Either case is undesirable. The concentration of the lithium salt is more preferably from 0.75 to 1.5 mol/l.

In the present secondary power source, the positive electrode is one made mainly of activated carbon. As activated carbon, it is preferred to use one obtained by activation treatment of a carbon material derived from a natural plant tissue such as a coconut shell, a synthetic resin such as a phenol resin, or a fossil fuel such as coal, coke or pitch. The activation method for activated carbon varies depending upon the starting material, but may usually be a steam-activation method or a molten alkali activation method such as a KOH activation method. In the present invention, either the steam-activation method or the molten alkali-activation method is preferably employed.

The positive electrode usually contains a binder as a shape-imparting material, other than activated carbon. As such a binder, polytetrafluoroethylene, polyvinylidene fluoride, polyamide or polyimide may, for example, be preferably employed. The content of the binder is preferably from 1 to 20 mass % in the positive electrode from the viewpoint of the balance between the characteristics and the strength of the positive electrode. Further, the positive electrode preferably contains an electrically conductive material to increase the electrical conductivity. As such an electrically conductive material, carbon black may, for example, be mentioned. The content of the electrically conductive material in the total mass of the positive electrode is preferably from 0.1 to 20 mass %, whereby a positive electrode having a large capacity and high electrical conductivity, can be obtained.

Further, it is preferred that the positive electrode contains a small amount of a lithium-containing transition metal oxide, whereby a decrease of lithium ions in the electrolyte due to lithium ions which cannot be undoped from the negative electrode, can be supplemented, and deterioration of the properties can be prevented. In such a case, the content of the lithium-containing transition metal oxide is preferably from 0.1 to 20 mass % in the positive electrode. If the content is less than 0.1 mass %, the effects of addition of a lithium-containing transition metal oxide can hardly be obtained. On the other hand, if it exceeds 20 mass %, the high output and high reliability which are characteristics of an activated carbon electrode, are likely to be impaired. The above content is more preferably from 3 to 15 mass %. As such a lithium-containing transition metal oxide, a composite oxide of lithium with at least one transition metal selected from the group consisting of V, Mn, Fe, Co, Ni, Zn and W, is preferred. Particularly preferred is a composite oxide of lithium with at least one member selected from the group consisting of Mn, Co and Ni. More preferred is $Li_xCo_yNi_{(1-y)}O_2$ or $Li_zMn_2O_4$, wherein $0<x<2$, $0 \leq y \leq 1$ and $0<z<2$.

As a method for preparing the positive electrode assembly, a method may, for example, be mentioned, wherein polytetrafluoroethylene as a binder is mixed and kneaded with an activated carbon powder, followed by forming into a sheet shape to obtain a positive electrode, which is then bonded to a current collector by means of an electrically conductive adhesive. Otherwise, an activated carbon powder may be dispersed in a varnish having polyvinylidene fluoride, polyamideimide, polyimide or the like dissolved as a binder, and the dispersion may be coated on a current collector by e.g. a doctor blade method, followed by drying.

In the present secondary power source, the negative electrode is one made mainly of a carbon material capable of doping and undoping lithium ions. The carbon material capable of doping and undoping lithium ions may be preferably one which forms an intercalation complex, and natural graphite, artificial graphite, petroleum coke, mesophase pitch type carbon material, hardly graphitizable carbon material, or a composite material or a mixed material of a graphite type material and a graphitizable carbon material, may, for example, be used. However, activated carbon is not usually a carbon material capable of doping and undoping lithium ions. The carbon material preferably has a lattice spacing of [002]face of from 0.335 to 0.410 nm as measured by X-ray diffraction, whereby a negative electrode having a high capacity can be obtained. The lattice spacing is particularly preferably from 0.335 to 0.338 nm, whereby the potential at the time of undoping lithium ions can be made low, and a negative electrode having a high capacity can be obtained. The lattice spacing is still further preferably from 0.354 to 0.395 nm, whereby a negative electrode having a larger capacity can be obtained. Further, the specific surface area of the carbon material is preferably from 0.5 to 20 m²/g. If the specific surface area exceeds 20 m²/g, a film formed on the surface of the carbon material (so-called solid electrolyte interface, SEI) tends to be too much, whereby the Coulomb efficiency is likely to be small.

Like the positive electrode, the negative electrode usually contains a binder as a shape-imparting material. As the binder, one similar to the binder useful for the positive electrode is preferably employed. The amount of the binder in the total mass of the negative electrode is preferably from 1 to 20%. For the negative electrode, a carbon material having a high electrical conductivity such as graphite, is used. Accordingly, even if an electrically conductive material is added as in the case of the positive electrode, no substantial improvement in the electrical conductivity will be obtained. However, an electrically conductive material may be added as the case requires.

Like the method for preparing the positive electrode assembly, the method for preparing the negative electrode assembly may, for example, be a method wherein a graphite type material is kneaded with polytetrafluoroethylene as a binder, followed by forming into a sheet, which is then bonded to a current collector by means of an electrically conductive adhesive. Otherwise, there may be a method wherein the above carbon material is dispersed in an organic solvent having polyvinylidene fluoride, polyamideimide, polyimide, a precursor of polyamideimide or a precursor of polyimide dissolved as a binder, and the dispersion may be coated on a current collector, followed by drying and heat treatment. Either method may preferably be employed as the method for preparing the negative electrode assembly.

Here, the precursor of polyamideimide or the precursor of polyimide is one which is polymerized by heating to form a polyamideimide or a polyimide, respectively. When the polyamideimide or the polyimide is used as a binder, the resistance against the organic electrolyte will be obtained, and adequate resistance can be obtained even when heated under reduced pressure or at a high temperature of about 300° C. to remove moisture from the electrode.

In the method for forming the negative electrode on the current collector by coating, the solvent for dissolving the binder or the precursor, is not particularly limited, but N-methyl-2-pyrrolidone (hereinafter referred to as NMP) is preferred, since it is readily available, and it provides good solubility. Further, the above-mentioned heating temperature is preferably at least 200° C., whereby when the precursor is used as the binder, it can be polymerized. The heat treatment is preferably carried out in an inert atmosphere such as nitrogen or argon, or under a reduced pressure of at most 133 Pa.

Further, the present invention provides a power source which is capable of charging and discharging, comprising a positive electrode assembly having a positive electrode and a current collector integrated, a negative electrode assembly having a negative electrode and a current collector integrated, and an organic electrolyte, wherein the current collector in the positive electrode assembly is aluminum, and said organic electrolyte comprises a solute which forms $ClO_4^-$ by ionization and a solute which forms $N(SO_2C_2F_5)_2^-$ by ionization. As mentioned above, an organic electrolyte comprising $LiClO_4$ and $LiN(SO_2C_2F_5)_2$, is very effective for a secondary power source having a positive electrode made mainly of activated carbon and a negative electrode made mainly of a carbon material capable of doping and undoping lithium ions. The anions in this electrolyte are $ClO_4^-$ and $N(SO_2C_2F_5)_2^-$, and the organic electrolyte comprising these anions (hereinafter referred to as the present organic electrolyte) exhibits high effects also in a power source capable of charging and discharging other than the present secondary power source. Namely, the present organic electrolyte is an organic electrolyte which does not corrode a current collector and can realize a high upper limit voltage when used for an electrical double layer capacitor or a lithium ion secondary cell having a positive electrode current collector made of aluminum and which has high charge and discharge cycle reliability when used for a power source capable of charging and discharging, which is operated at a temperature of at least room temperature, particularly at a temperature of 45° C. or higher.

$N(SO_2C_2F_5)_2^-$ is less likely to cause corrosion of a positive electrode current collector made of aluminum than $N(SO_2CF_3)_2^-$. For example, Journal of Power Sources, 68(1997)320–325 reports that when an organic electrolyte containing $LiN(SO_2CF_3)_2$ is used for a lithium ion secondary cell, aluminum will be corroded when the positive electrode potential exceeds 3.55V (reference electrode: $Li^+$/Li), while no corrosion takes place until 4.5V with an organic electrolyte containing $LiN(SO_2C_2F_5)_2$. Further, $N(SO_2C_2F_5)_2^-$ is less susceptible to hydrolysis as compared with $PF_6^-$ or $BF_4^-$, and it is also excellent in electrical conductivity as an electrolyte.

The detailed reason why corrosion of the current collector can be suppressed by the addition of the solute which forms $ClO_4^-$ by ionization, is not clearly understood, but may be explained as follows. Metal aluminum reacts with oxygen in air to form an oxide coating film on its surface, whereby it will stay stable without receiving corrosion. $PF_6^-$ or $BF_4^-$ will not destroy this oxide coating film, whereby no corrosion takes place. $N(SO_2C_2F_5)_2^-$ is likely to destroy the aluminum oxide coating film, but when $ClO_4^-$ is added, $ClO_4^-$ is oxidized and decomposed to form a stable oxide coating film, whereby corrosion of the positive electrode current collector made of aluminum can be suppressed. At a temperature exceeding room temperature, particularly at a temperature of 45° C. or higher, this oxidation decomposition rate of $ClO_4^-$ increases, whereby it has excellent charge and discharge cycle reliability even when operated at a high temperature.

In the present organic electrolyte, it is preferred that in the total anions, the content of $ClO_4^-$ is from 0.1 to 40 mol %, and the content of $N(SO_2C_2F_5)_2^-$ is from 60 to 99.9 mol %. If the content of $ClO_4^-$ is less than 0.1 mol %, the above-mentioned effect of adding $ClO_4^-$ cannot be obtained, such being undesirable. On the other hand, if the content of $ClO_4^-$ exceeds 40 mol %, the stable chemical nature of $N(SO_2C_2F_5)_2^-$ tends to be impaired, and sufficient care in handling will be required and restrictions in practical use will be substantial, such being undesirable. More preferably, in the total anions, the content of $ClO_4^-$ is from 5 to 25 mol %, and the content of $N(SO_2C_2F_5)_2^-$ is from 75 to 95 mol %.

Like the concentration of the lithium salt contained in the organic electrolyte of the present secondary source, the concentration as the total of solutes in the present organic electrolyte is preferably from 0.5 to 2.0 mol/l, more preferably from 0.75 to 1.5 mol/l.

Also in the organic electrolyte of the present invention, as the solvent, the same one as the solvent to be used for the organic electrolyte of the present secondary power source, is preferably employed. In a case where the solvent is to be used for a lithium ion secondary cell, a combination of ethylene carbonate with at least one member selected from the group consisting of propylene carbonate, dimethyl carbonate, ethylmethyl carbonate and diethyl carbonate, is particularly preferred from the viewpoint of the temperature characteristics and the electrochemical characteristics. In a case where the solvent is to be used for an electric double layer capacitor, a solvent made mainly of propylene carbonate is preferred from the viewpoint of the temperature characteristics and the electrochemical characteristics.

The present organic electrolyte is used preferably for a lithium ion secondary cell comprising a positive electrode made mainly of a lithium-containing transition metal oxide, a negative electrode made mainly of a carbon material capable of doping and undoping lithium ions and a current collector made of aluminum for the positive electrode. When the electrolyte is used for a lithium ion secondary cell, the solute is a lithium salt, and it comprises $LiN(SO_2C_2F_5)_2$ and $LiClO_4$.

Further, the present organic electrolyte is used preferably for an electric double layer capacitor having polarizable electrodes made mainly of activated carbon for both positive and negative electrodes, wherein the positive electrode is provided with a current collector made of aluminum. When it is used for an electrical double layer capacitor, it is preferred to use as a solute a quaternary onium salt which forms at least one cation selected from the group consisting of $(C_2H_5)_4N^+$, $(C_2H_5)_3(CH_3)N^+$ and $(C_2H_5)_4P^+$ by ionization. Particularly, it is preferred to employ a solute comprising $(C_2H_5)_3(CH_3)NN(SO_2C_2F_5)_2$ and $(C_2H_5)_3(CH_3)NClO_4$.

Now, the present invention will be described in further detail with reference to Examples (Examples 1, 4 to 6, 8, 9, and 11 to 18) and Comparative Examples (Examples 2, 3, 7, 10, 19 and 20). However, the present invention is by no means restricted by them.

Further, preparation of cells in Examples 1 to 20 was all carried out in an argon globe box having a dew point of −60° C. or lower.

EXAMPLE 1 (PRESENT INVENTION)

A mixture comprising 70 mass % of activated carbon having a specific surface area of 900 $m^2$/g obtained by a molten KOH activation method using coke as the starting material, 20 mass % of conductive carbon black and 10 mass % of polytetrafluoroethylene as a binder, was added to ethanol, followed by kneading, rolling and drying in vacuum at 200° C. for 2 hours to obtain a positive electrode sheet. This positive electrode sheet was bonded to a current collector made of aluminum (thickness: about 100 μm) by a conductive adhesive and dried in vacuum at 200° C. for 15 hours to obtain a positive electrode assembly.

Then, amorphous carbon having a particle diameter of 19 μm and a lattice spacing of [002]face of 0.378 nm as measured by X-ray diffraction was used, as a carbon material capable of doping and undoping lithium ions. Graphitized vapor grown carbon fiber as a conductive material was added thereto, and the mixture was dispersed in NMP having polyvinylidene fluoride (a binder) dissolved. This dispersion was coated on a current collector made of copper (thickness: about 18 μm) and dried to obtain a negative electrode assembly. The negative electrode assembly comprised 70 mass % of the above-mentioned amorphous carbon, 10 mass % of the graphitized vapor grown carbon fiber and 20 mass % of polyvinylidene fluoride. This negative electrode assembly was further pressed by a roll pressing machine.

The positive electrode assembly (thickness: about 200 μm) and the negative electrode assembly (thickness: about 40 μm) having an area of 9.6 cm$^2$ thus obtained, were disposed to face each other with a polypropylene separator (thickness: about 80 μm) interposed therebetween and impregnated for a sufficient time in an organic electrolyte having 1 mol/l of $LiN(SO_2C_2F_5)_2$ dissolved in a solvent mixture comprising 50 vol % of ethylene carbonate and 50 vol % of ethylmethyl carbonate, and then sealed in a laminate pack made of aluminum to obtain a cell of the present secondary power source. The initial capacity of the obtained cell was measured within a voltage range of from 4.2V to 2.75V at a current of 192 mA (20 mA/cm$^2$) and 288 mA (30 mA/cm$^2$). The results are shown in Table 1. In Table 1, the capacity (mAh) at a discharge current of 192 mA is referred to as capacity 1, and the capacity (mAh) at the discharge current of 288 mA is referred to as capacity 2. Thereafter, a charge and discharge cycle test of 500 cycles was carried out in an atmosphere of 45° C. within a voltage range of from 4.2V to 2.75V at a charge and discharge current of 192 mA, whereupon the reduction (%) of the capacity after the cycle test against the initial capacity, was calculated. The results are shown in Table 1. The smaller the reduction of the capacity, the higher the charge and discharge cycle reliability.

EXAMPLE 2 (COMPARATIVE EXAMPLE)

A cell was prepared in the same manner as in Example 1 except that as the solute, $LiBF_4$ was used instead of $LiN(SO_2C_2F_5)_2$, and the capacity and the reduction of the capacity were measured. The results are shown in Table 1.

EXAMPLE 3 (COMPARATIVE EXAMPLE)

A cell was prepared in the same manner as in Example 1 except that as the solute, $LiN(SO_2CF_3)_2$ was used instead of $LiN(SO_2C_2F_5)_2$, and the capacity and the reduction of the capacity were measured. The results are shown in Table 1.

TABLE 1

|  | Capacity 1 | Capacity 2 | Reduction of the capacity |
|---|---|---|---|
| Example 1 | 1.160 | 0.995 | 13 |
| Example 2 | 0.998 | 0.724 | 8 |
| Example 3 | 1.252 | 1.054 | 72 |

EXAMPLE 4 (PRESENT INVENTION)

The positive electrode assembly (thickness: about 200 μm) and the negative electrode assembly (thickness: about 40 μm) having an area of 10.0 cm$^2$ obtained in the same manner as in Example 1, and disposed to face each other with a polypropylene separator (thickness: about 80 μm) interposed therebetween, and then impregnated for a sufficient time in an organic electrolyte having 1.0 mol/l of $LiN(SO_2CF_3)(SO_2C_2F_5)$ dissolved in a solvent mixture comprising 50 vol % of ethylene carbonate and 50 vol % of ethylmethyl carbonate and sealed in a laminate pack made of aluminum to obtain a cell of the present secondary power source. The initial capacity (mAh) of the obtained cell was measured within a voltage range of from 4.0V to 2.0V at a charge and discharge current of 100 mA (10 mA/cm$^2$). Thereafter, a charge and discharge cycle test of 1,000 cycles was carried out in an atmosphere of 45° C. within a voltage range of from 4.0V to 2.0V at a charge and discharge current of 100 mA, whereupon the reduction (%) of the capacity after the cycle test against the initial capacity was calculated. The results are shown in Table 2.

EXAMPLE 5 (PRESENT INVENTION)

A cell was prepared in the same manner as in Example 4 except that as the solute, $LiN(SO_2CF_3)(SO_2C_3F_7)$ was used instead of $LiN(SO_2CF_3)(SO_2C_2F_5)$, and the capacity and the reduction of the capacity were measured. The results are shown in Table 2.

EXAMPLE 6 (PRESENT INVENTION)

A cell was prepared in the same manner as in Example 4 except that as the solute, $LiN(SO_2CF_3)(SO_2C_2F_9)$ was used instead of $LiN(SO_2CF_3)(SO_2C_2F_5)$, and the capacity and the reduction of the capacity were measured. The results are shown in Table 2.

EXAMPLE 7 (COMPARATIVE EXAMPLE)

A cell was prepared in the same manner as in Example 4 except that as the solute, $LiBF_4$ was used instead of $LiN(SO_2CF_3)(SO_2C_2F_5)$, and the capacity and the reduction of the capacity were measured. The results are shown in Table 2.

TABLE 2

|  | Initial capacity | Reduction of the capacity |
|---|---|---|
| Example 4 | 1.315 | 10.8 |
| Example 5 | 1.246 | 9.5 |
| Example 6 | 1.191 | 8.8 |
| Example 7 | 1.154 | 13.3 |

EXAMPLE 8 (PRESENT INVENTION)

The positive electrode assembly (thickness: about 900 μm) and the negative electrode assembly (thickness: about 100 μm) having an area of 0.283 cm$^2$ obtained in the same manner as in Example 1, were fixed to a positive electrode cap and a negative electrode case of coin cell (diameter: 10.8 mm, height: 1.7 mm), respectively, and disposed to face each other with a polypropylene separator (thickness: about 100 μm) interposed therebetween, and then impregnated for a sufficient time in an organic electrolyte having 0.1 mol/l of LiClO$_4$ and 0.9 mol/l of LiN(SO$_2$CF$_3$)$_2$ dissolved in a solvent mixture comprising 50 vol % of ethylene carbonate and 50 vol % of ethylmethyl carbonate, and sealed in coin cell to obtain a cell of the present secondary power source. The initial capacity (mAh) of the obtained cell was measured within a voltage range of from 4.2V to 2.75V at a current of 0.283 mA (1.0 mA/cm$^2$). Thereafter, a charge and discharge cycle test of 1,000 cycles was carried out in an atmosphere of 45° C. within a voltage range of from 4.2V to 2.75V at a charge and discharge current of 0.283 mA, whereupon the reduction (%) of the capacity after the cycle test against the initial capacity, was calculated. The results are shown in Table 3.

EXAMPLE 9 (PRESENT INVENTION)

A cell was prepared in the same manner as in Example 8 except that as the solute, LiN(SO$_2$C$_2$F$_5$)$_2$ was used instead of LiN(SO$_2$CF$_3$)$_2$, and the capacity and the reduction of the capacity were measured. The results are shown in Table 3.

EXAMPLE 10 (COMPARATIVE EXAMPLE)

A cell was prepared in the same manner as in Example 8 except that as the solute, 1.0 mol/l of LiN(SO$_2$CF$_3$)$_2$ was used instead of 0.1 mol/l of LiClO$_4$ and 0.9 mol/l of LiN(SO$_2$CF$_3$)$_2$, and the capacity and the reduction of the capacity were measured. The results are shown in Table 3.

EXAMPLE 11 (PRESENT INVENTION)

A cell was prepared in the same manner as in Example 10 except that as the solute, LiN(SO$_2$C$_2$F$_5$)$_2$ was used instead of LiN(SO$_2$CF$_3$)$_2$, and the capacity and the reduction of the capacity were measured. The results are shown in Table 3.

TABLE 3

|  | Initial capacity | Reduction of the capacity |
| --- | --- | --- |
| Example 8 | 0.328 | 13.7 |
| Example 9 | 0.325 | 11.1 |
| Example 10 | 0.324 | 25.6 |
| Example 11 | 0.321 | 16.2 |

With respect to the cells obtained in Examples 8 to 11, by comparing Examples 8 and 10, and Examples 9 and 11, respectively, in Table 3, it is evident that the properties are improved by combination of LiClO$_4$ with e.g. LiN(SO$_2$C$_2$F$_5$)$_2$. Further, by comparing Examples 10 and 11, it is evident that the cell employing LiN(SO$_2$C$_2$F$_5$)$_2$ as the solute is superior to LiN(SO$_2$CF$_3$)$_2$ from the viewpoint of the charge and discharge cycle reliability.

EXAMPLE 12 (PRESENT INVENTION)

The positive electrode assembly (thickness: about 200 μm) and the negative electrode assembly (thickness: about 40 μm) having an area of 10.0 cm$^2$ obtained in the same manner as in Example 1 were disposed to face each other with a polypropylene separator (thickness about 80 μm) interposed therebetween, and then impregnated for a sufficient time in an organic electrolyte having 0.9 mol/l of LiN(SO$_2$CF$_3$) (SO$_2$C$_2$F$_5$) and 0.1 mol/l of LiClO$_4$ in a solvent mixture comprising 50 vol % of ethylene carbonate and 50 vol % of ethylmethyl carbonate, and sealed in a aluminum laminate pack to obtain a cell of the present secondary power source. The initial capacity (mAh) of the obtained cell was measured within a voltage range of from 4.0V to 2.0V at a charge and discharge current of 100 mA (10 mA/cm$^2$). Thereafter, a charge and discharge cycle test of 1,000 cycles was carried out in an atmosphere of 45° C. within a voltage range of from 4.0V to 2.0V at a charge and discharge current of 100 mA whereupon the reduction (%) of the capacity after the cycle test against the initial capacity, was calculated. The results are shown in Table 4.

EXAMPLE 13 (PRESENT INVENTION)

A cell was prepared in the same manner as in Example 12 except that as the solute, LiN(SO$_2$CF$_3$) (SO$_2$C$_3$F$_7$) was used instead of LiN(SO$_2$CF$_3$) (SO$_2$C$_2$F$_5$), and the capacity and the reduction of the capacity were measured. The results are shown in Table 4.

EXAMPLE 14 (PRESENT INVENTION)

A cell was prepared in the same manner as in Example 12 except that as the solute, LiN(SO$_2$CF$_3$) (SO$_2$C$_4$F$_9$) was used instead of LiN(SO$_2$CF$_3$) (SO2C$_2$F$_5$), and the capacity and the reduction of the capacity were measured. The results are shown in Table 4.

EXAMPLE 15 (PRESENT INVENTION)

A cell was prepared in the same manner as in Example 12 except that as the solute, LiN(SO$_2$CF$_3$)$_2$ was used instead of LiN(SO$_2$CF$_3$) (SO$_2$C$_2$F$_5$), and the capacity and the reduction of the capacity were measured. The results are shown in Table 4.

EXAMPLE 16 (PRESENT INVENTION)

A cell was prepared in the same manner as in Example 12 except that as the solute, LiN(SO$_2$C$_2$F$_5$)$_2$ was used instead of LiN(SO$_2$CF$_3$) (SO$_2$C$_2$F$_5$), and the capacity and the reduction of the capacity were measured. The results are shown in Table 4.

TABLE 4

|  | Initial capacity | Reduction of the capacity |
| --- | --- | --- |
| Example 12 | 1.286 | 9.1 |
| Example 13 | 1.213 | 8.6 |
| Example 14 | 1.101 | 7.1 |
| Example 15 | 1.329 | 9.5 |
| Example 16 | 1.222 | 5.2 |

EXAMPLE 17 (PRESENT INVENTION)

LiCoO$_2$ and graphite as a conductive material were dispersed in a solution having polyvinylidene fluoride dissolved in N-methyl-2-pyrrolidone (hereinafter referred to as NMP), and the dispersion was coated on an aluminum current collector (thickness: about 30 μm) and dried to obtain a positive electrode assembly. The mass ratio of LiCoO$_2$:graphite:polyvinylidene fluoride in the positive electrode assembly was 8:1:1.

Then, highly crystalline graphite (MCMB6-28, tradename, manufactured by Osaka Gas Co., Ltd.) as a carbon material capable of doping and undoping lithium ions, was dispersed in a solution having polyvinylidene fluoride dissolved in NMP, and the dispersion was coated on a current collector made of copper (thickness: about 18 μm) and dried to obtain a negative electrode assembly. The mass ratio of highly crystalline graphite:polyvinylidene fluoride in the negative electrode assembly was 9:1.

The positive electrode assembly (thickness: about 60 μm) and the negative electrode assembly (thickness: about 40 μm) having an area of 10.0 cm² thus obtained were disposed to face each other with a polypropylene separator (thickness: about 20 μm) interposed therebetween and impregnated for a sufficient time in an organic electrolyte having 0.9 mol/l of $LiN(SO_2C_2F_5)_2$ and 0.1 mol/l of $LiClO_4$ dissolved in a solvent mixture comprising 50 vol % of ethylene carbonate and 50 vol % of ethylmethyl carbonate, and then sealed in a laminate pack of aluminum to obtain a cell of a lithium ion secondary cell. The initial capacity (mAh) of the obtained cell was measured within a range of from 4.1V to 2.0V at a current of 10 mA (1.0 mA/cm²). Thereafter, a voltage of 4.1V was continuously applied in an atmosphere of 60° C., and upon expiration of 500 hours, the capacity (mAh) was measured again. Then, the cell was decomposed, and the amount of aluminum eluted (μg/organic electrolyte-g) in the organic electrolyte contained in the separator was measured by a ICP emission spectroscopic analysis. The results are shown in Table 5.

EXAMPLE 18 (PRESENT INVENTION)

Positive electrode sheets obtained in the same manner as in Example 1 were bonded to two sheets of aluminum current collectors (thickness: about 100 μm) respectively by a conductive adhesive and dried in vacuum at 200° C. for 15 hours to obtain electrode assemblies, which were used as a positive electrode assembly and a negative electrode assembly.

The positive electrode assembly (thickness: about 250 μm) and the negative electrode assembly (thickness: 250 μm) having an area of 10.0 cm² thus obtained were disposed to face each other with a polypropylene separator (thickness: about 80 μm) interposed therebetween, and impregnated for a sufficient time in an organic electrolyte having 1.35 mol/l of $(C_2H_5)_3(CH_3)NN(SO_2C_2F_5)_2$ and 0.1 mol/l of $(C_2H_5)_3(CH_3)NClO_4$ dissolved in a propylene carbonate solvent, and then sealed in an aluminum laminate pack to obtain a cell of an electric double layer capacitor. The initial capacity (mAh) of this cell was measured within a range of from 2.5V to 1.0V at a current of 10 mA (1.0 mA/cm²). Thereafter, a voltage of 2.5V was continuously applied in an atmosphere of 60° C., and upon expiration of 500 hours, the capacity (mAh) was measured. Then, in the same manner as in Example 15, the amount of aluminum eluted (μg/organic electrolyte-g) in the organic electrolyte contained in the separator, was measured. The results are shown in Table 5.

EXAMPLE 19 (COMPARATIVE EXAMPLE)

A cell was prepared in the same manner as in Example 15 except that as the solute 1.0 mol/l of $LiN(SO_2C_2F_5)_2$ was used instead of 0.9 mol/l of $LiN(SO_2C_2F_5)_2$ and 0.1 mol/l of $LiClO_4$, and the initial capacity, the capacity after expiration of 500 hours and the amount of aluminum eluted were measured. The results are shown in Table 5.

EXAMPLE 20 (COMPARATIVE EXAMPLE)

A cell was prepared in the same manner as in Example 16 except that as the solute, 1.5 mol/l of $(C_2H_5)_3(CH_3)NN(SO_2C_2F_5)_2$ was used instead of 1.35 mol/l of $(C_2H_5)_3(CH_3)NN(SO_2C_2F_5)_2$ and 0.1 mol/l of $(C_2H_5)_3(CH_3)NClO_4$, and the initial capacity, the capacity upon expiration of 500 hours and the amount of aluminum eluted, were measured. The results are shown in Table 5.

TABLE 5

|  | Initial capacity | Capacity after 500 hr | Amount of aluminum eluted |
|---|---|---|---|
| Example 17 | 11.5 | 9.6 | 4.4 |
| Example 18 | 1.65 | 1.27 | 2.9 |
| Example 19 | 11.6 | 8.4 | 1220.1 |
| Example 20 | 1.67 | 1.09 | 860.4 |

With the lithium ion secondary cell obtained in Example 17 and the electric double layer capacitor obtained in Example 18, elution of aluminum is remarkably suppressed, and reduction of the capacity is little even when they are operated at a high temperature, as compared with Examples 19 and 20, respectively.

As described in the foregoing, according to the present invention, it is possible to obtain a secondary power source which has a high upper limit voltage, a high charge and discharge capacity and excellent cycle reliability in rapid charging and discharging.

Further, the organic electrolyte of the present invention is an organic electrolyte which does not corrode a current collector even when used for an electric double layer capacitor or a lithium ion secondary cell having a positive electrode current collector made of aluminum and which can be operated at a high voltage at a high temperature and has high charge and discharge cycle reliability. Further, even when it is used in an electric double layer capacitor or a lithium ion secondary cell which is operated at a temperature of at least room temperature, particularly at 45° C. or higher, reduction of the capacity is little, and it is excellent in charge and discharge cycle reliability.

The entire disclosures of Japanese Patent Application No. 2001-224321 filed on Jul. 25, 2001, Japanese Patent Application No. 2001-286853 filed on Sep. 20, 2001 and Japanese Patent Application No. 2001-342718 filed on Nov. 8, 2001 including specifications, claims and summaries are incorporated herein by reference in their entireties.

What is claimed is:

1. A secondary power source comprising a positive electrode made mainly of activated carbon, a negative electrode made mainly of a carbon material capable of doping and undoping lithium ions and an organic electrolyte containing a solute of a lithium salt, wherein the lithium salt comprises $LiClO_4$ and $LiN(SO_2R^{f11})(SO_2R^{f12})$ wherein each of $R^{f11}$ and $R^{f12}$ which are independent of each other, is a $(_{01-6})$ perfluoroalkyl group and wherein the lithium salt, from 1 to 40 mol % is $LiClO_4$ and from 60 to 99 mol % is $LiN(SO_2R^{f11})(SO_2R^{f12})$.

2. The secondary power source according to claim 1, wherein the lithium salt comprises $LiClO_4$ and at least one member selected from the group consisting of $LiN(SO_2CF_3)_2$ and $LiN(SO_2C_2F_5)_2$.

3. The secondary power source according to claim 1, wherein the lithium salt comprises $LiClO_4$ and $LiN(SO_2C_2F_5)_2$.

4. The secondary power source according to claim 3, wherein the positive electrode has a current collector made of aluminum.

5. The secondary power source according to claim 1, wherein the positive electrode has a current collector made of aluminum.

6. The secondary power source according to claim 1, wherein the solvent of the organic electrolyte is at least one member selected from the group consisting of ethylene carbonate, propylene carbonate, dimethyl carbonate, ethylmethyl carbonate and diethyl carbonate.

7. The secondary power source according to claim 1, wherein the concentration of the lithium salt in the organic electrolyte is from 0.5 to 2.0 mol/l.

8. The secondary power source according to claim 1, wherein the carbon material contained in the negative electrode has a lattice spacing of [002]face of from 0.335 to 0.410 nm as measured by X-ray diffraction.

* * * * *